W. L. MITTEN.
METHOD OF MANUFACTURING TIRES.
APPLICATION FILED NOV. 12, 1917.

1,302,405. Patented Apr. 29, 1919.

Witness:
Chas. Nielsen, Jr.

Inventor
Worth L. Mitten,
By Jerry A. Mathews,
Attorney

UNITED STATES PATENT OFFICE.

WORTH L. MITTEN, OF DAVENPORT, IOWA.

METHOD OF MANUFACTURING TIRES.

1,302,405.   Specification of Letters Patent.   Patented Apr. 29, 1919.

Application filed November 12, 1917. Serial No. 201,561.

*To all whom it may concern:*

Be it known that I, WORTH L. MITTEN, a citizen of the United States, residing at Davenport, in the county of Scott and State of Iowa, have invented certain new and useful Improvements in Methods of Manufacturing Tires, of which the following is a specification.

It is an object of this invention to increase the efficiency and strength of what are known as "cord" tires.

Among other objects and advantages it is a purpose of the invention to enable the formation of a cord tire casing of a highly efficient character in an inexpensive manner. It is a particular aim to obviate the necessity for weaving the cord fabric on the mandrel and to permit rapid production of the cord carcass from prepared sheeting having cords placed therein and adapted to be produced by extremely simple methods.

In the drawings forming part of this application,

Figure 1:
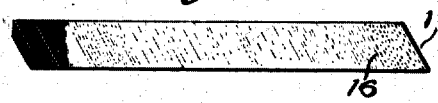
Figure 1 is a plan of a blank for use in the assembly of the carcass.

In the manufacture of my tire, I employ a mandrel or ring core 10, which may correspond to the usual ring core employed in tire manufacture, and may be mounted upon the ordinary spider, or in any other manner desired. I prefer, however to form the mandrel with means for expanding it, and at present employ a mandrel comprising a rigid inner ring 11, and an expansible outer section 12 adapted to fit snugly therearound in one position, and to be expanded by means of screws 13 projecting from the inner side of the ring 11, when required. The rigid ring 11 is provided with the usual bead groove 14 at the sides, and devices 15 of any suitable form are provided for holding the beads in place when positioned upon the mandrel.

Figure 2:
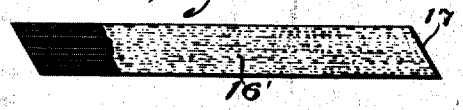
Fig. 2 is a similar view of another blank.

For the production of my tire I prepare a friction fabric in which, instead of a woven cloth, there are embedded merely parallel strands or cords 16$^a$ of suitable strength and structure of which there are various forms available in the art for such uses, the fabric being prepared in large sheets and cut into blanks 16$^b$ or 16$^c$, as illustrated in Figs. 1 and 2, these blanks having the form of a short length of ribbon several inches wide for ordinary sizes of tires and having a length sufficient to extend over the mandrel from one side to the other and to have its ends turned backwardly over the intermediate portions a greater or less distance according to the character of tire which it is desired to produce. The ends of the blank are cut diagonally as shown at 17, and the cords may run longitudinally of the blank as shown in Fig. 2, or diagonally, parallel to the diagonal end edges, as show in Fig. 1, though it may be found desirable to have the cords extend at some other angle to the axis of the blank, and it may also be found desirable to form the blanks in a different shape, in the development of the invention. The rubber of the fabric may be pure gum, or such other preparation of rubber or other suitable material as found most desirable in accordance with the practices of the art.

Figure 4:
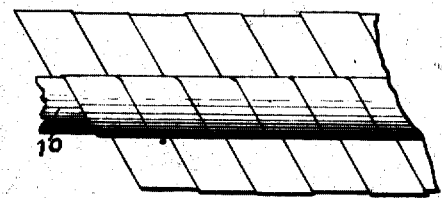
Fig. 4 is a top view of the mandrel, with blanks in the first stage of assembly.
Figure 6:
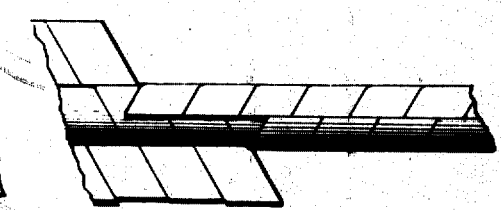
Fig. 6 is a view similar to Fig. 4 showing the third stage in one form of tire.

In producing a carcass in accordance with my invention, a suitable number of blanks 16 or 16' having been prepared, they are laid diagonally across the mandrel, as shown in Fig. 4, without overlap, but with edges snugly abutting. The diagonal end edges 17 are parallel to the plane of the mandrel when the strips are held outwardly as indicated in the drawing. The mandrel having been completely covered in this way, the loose ends of the strips being allowed to hang free or otherwise disposed so as to not interfere with the operations described and to be described, the bead ring 18 is adjusted in the groove 14 at each side, and the securing devices 15 put into position after the loose ends of the blanks are lifted and laid loosely upon the outer part of the carcass. If desired, a suitable cement may then be applied to the outer surfaces of the intermediate portions of the blanks where they extend around the mandrel, and to the upper side of the extended end portions, and these are then laid inwardly and snugly against the intermediate portions of the blank and all air expressed, the end portions being extended in a direction at such an angle to the direction of the intermediate portions of the blank, as found most effective, somewhat as indicated in Fig. 6. Subsequently or before, as found most desirable, the outer section 12 of the mandrel is expanded so as to put all of the cords in the blanks 16 under an even tension, the mandrel preferably having its extended position the size which it is desired the finished carcass shall have upon the interior. The ends of the blanks are trimmed so as to meet snugly at the middle of the carcass on the outside as shown in Fig. 6, in case it is desired that the mandrel shall have a two-ply thickness. The parts having been secured in position suitably at this stage of the work, for which purpose any desirable process may be employed, in accordance with the practices of the art, the carcass may be removed from the mandrel, and is then preferably turned or inverted, bringing the underside on top so that the meeting ends of the blanks are located upon the inner side of the carcass. The exterior covering of the casing, breaker strip and tread may be then applied in any usual way in accordance with any of the well known practices in the art, and the tire otherwise finished according to the type to be produced.

Figures 3, 8:
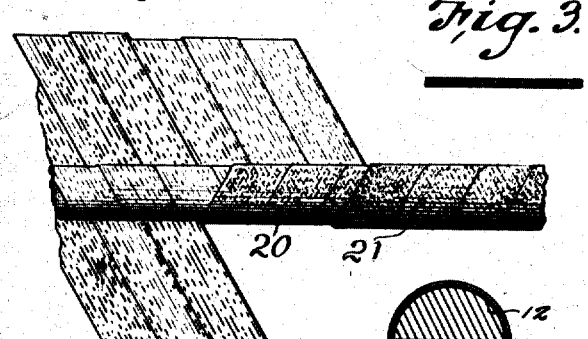
Fig. 3 is a cross section of the blank.
Fig. 8 is a view similar to Fig. 6 showing a tire with three ply cord fabric.
Figure 5:
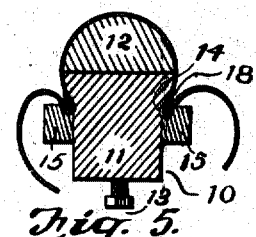
Fig. 5 is a cross section thereof and illustrative of the second stage of assembly.
Figures 7, 9:
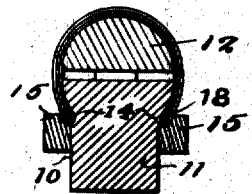
Fig. 7 is a cross section.
Fig. 9 is a cross section thereof.
Figure 10:
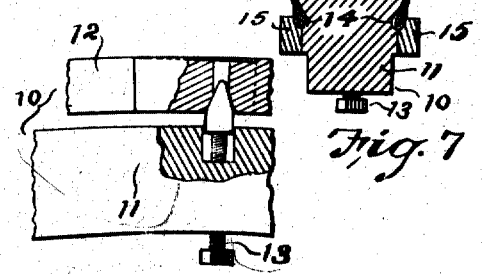
Fig. 10 is a detail of the mandrel.

It is possible by my method to construct a carcass with a three ply cord body by forming the blanks of fabric long enough to permit each end portion, after the blank is laid with its central portion around the mandrel and engaged under the bead, to extend over the intermediate portion of the blank to the opposite side of the mandrel, as indicated in Figs. 8 and 9, first the end portions at one side being laid over in this way and extended close to the bead, as indicated at 20, in Fig. 8, and the end portions from the opposite side being brought over likewise as indicated at 21, the parts being secured together suitably and all air expressed as far as possible. The carcass after the building operation described may be partly cured if desired, or the breaker strip and thread portions built up thereon and one cure employed for the complete tire, as preferred. In the last described form of the carcass, after the building up operation as illustrated in Fig. 8, and proper securement of the parts in built up relation, the carcass may be inverted, to bring the under side on top, as with the first described form of the carcass, or it may be left as built. It is preferably my practice, after the formation of the carcass as described, to mount the same upon a rim over an air bag inflated to a desirable pressure, while the breaker strip, tread and finish are assembled thereon. By turning or inverting the casing as above described, the flap ends are brought inside, and the full length cords are brought to the outer surface, so as to prevent the tire from blowing up or breaking loose under strain.

In this way, it has been found practicable to make a cord tire of evenly wound cords without the necessity of weaving a lengthy cord upon the carcass, the long overlap in the fabric blanks serving to effect secure retention of the structure element in the carcass in proper relation without liability of disintegration through friction. This accords with the discovery made in the American art that stitching of overlapped fabric or other positive securement of the fiber parts is not required, where a good overlap is made and a good quality of uniting rubber employed.

What is claimed:

1. The method of constructing a pneumatic tire casing, base or carcass, consisting in forming a fabric of parallel evenly wound cords; forming from said fabric a multiplicity of comparatively short and narrow blanks with the cords extending longitudinally thereof; laying these successively across the periphery of a mandrel with the cords extending from side to side, with the major dimension of the blank extending diagonally with respect to the medial plane of the mandrel; fitting bead elements over the intermediate end portions; mechanically expanding the mandrel; folding in the end portions of the blanks snugly around the bead elements and upon the intermediate parts of the blanks; removing the carcass from the mandrel and turning the under side on top; and applying tread rubber.

2. The method of constructing a pneumatic tire casing, base or carcass, consisting in forming a fabric of parallel cords; forming from said fabric a multiplicity of comparatively short and narrow blanks; laying these successively across the periphery of a mandrel with the cords extending from side to side; fitting bead elements over the intermediate end portions; folding in the end portions of the said blanks snugly around the bead elements and upon the intermediate parts of the blanks; removing the carcass from the mandrel; turning the under side on top; and applying rubber to the tire casing.

3. The method of constructing a pneumatic tire casing, base or carcass consisting in forming a multiplicity of comparatively short and narrow blanks consisting of parallel cords embedded in a suitable gum or rubber material; arranging the blanks diagonally over a mandrel with the ends of the blanks turned backwardly over the intermediate portions to give the desired number of plies; fitting bead elements over the intermediate end portions; folding in the end portions of the blanks snugly around the bead elements and upon the intermediate parts of the blanks; expanding the mandrel;

removing the carcass from the mandrel and turning the under side on top.

4. The method of constructing a pneumatic tire casing, base or carcass, consisting in forming a fabric of rubber or the like having parallel cords therein; forming from said fabric a multiplicity of comparatively short and narrow blanks; laying these successively across the periphery of an annular mandrel with the cords extending from side to side, with the major dimension of the blank extending diagonally with respect to the medial plane of the mandrel; fitting bead elements over the intermediate end portions; folding in the end portions of said blanks snugly around the bead elements and upon the intermediate parts of the blanks, the blanks being of a length sufficient for their ends to overlap to provide a three-ply cord fabric over the middle part of the carcass; and turning the completed carcass to bring the under side on top.

5. The method of constructing a pneumatic tire casing, consisting in preparing a blanket of parallel cords embedded in gum or rubber; preparing a multiplicity of short narrow strips therefrom with the cords extending longitudinally of the strips; laying these strips successively across the periphery of a mandrel with the cords extending from side to side, with the major dimension of the blank extending diagonally with respect to the medial plane of the mandrel; suitably securing the strips in the desired overlapping relation to provide the desired number of plies of fabric across the tread; inverting the casing so that the underside will come on top; suitably expanding the inverted casing; and applying the breaker strip, tread and finish, substantially as set forth.

In testimony whereof I have affixed my signature in the presence of two witnesses.

WORTH L. MITTEN.

Witnesses:
JOSEPH A. CONNOLLY,
HENRY L. DOLAN.